United States Patent
Bae et al.

(10) Patent No.: US 12,337,649 B2
(45) Date of Patent: Jun. 24, 2025

(54) SYSTEM AND METHOD FOR CONTROLLING AFTER BLOW FOR MOBILITY

(71) Applicants: Hyundai Motor Company, Seoul (KR); Kia Corporation, Seoul (KR)

(72) Inventors: Won Young Bae, Seoul (KR); Woo Hyeok Ahn, Suwon-Si (KR); Yong Chan Kim, Gunpo-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 232 days.

(21) Appl. No.: 18/099,465

(22) Filed: Jan. 20, 2023

(65) Prior Publication Data
US 2024/0051371 A1    Feb. 15, 2024

(30) Foreign Application Priority Data
Aug. 12, 2022    (KR) .................... 10-2022-0101407

(51) Int. Cl.
*B60H 1/00*    (2006.01)
*B60L 58/12*    (2019.01)

(52) U.S. Cl.
CPC ..... *B60H 1/00428* (2013.01); *B60H 1/00764* (2013.01); *B60H 1/008* (2013.01); *B60H 1/00828* (2013.01); *B60L 58/12* (2019.02)

(58) Field of Classification Search
CPC ............ B60H 1/00428; B60H 1/00735; B60H 1/00764; B60H 1/00778; B60H 1/00828
See application file for complete search history.

(56) References Cited

U.S. PATENT DOCUMENTS

| | | | | |
|---|---|---|---|---|
| 6,518,727 B2* | 2/2003 | Oomura | ............. | B60H 1/00428 320/135 |
| 7,520,352 B2* | 4/2009 | Hoshiba | ............. | B60H 1/00428 180/65.285 |
| 8,039,988 B2* | 10/2011 | Tarnowsky | ......... | H01M 10/443 307/10.7 |
| 8,639,413 B2* | 1/2014 | Endo | .................. | B60H 1/00428 701/29.2 |
| 12,023,990 B2* | 7/2024 | Lee | ......................... | B60L 1/003 |

FOREIGN PATENT DOCUMENTS

| | | |
|---|---|---|
| JP | 2021-123149 | 8/2021 |
| KR | 10-2008-0092527 | 10/2008 |
| KR | 10-1917675 | 11/2018 |
| KR | 10-2018-0129356 | 12/2018 |
| KR | 10-2020-0124988 | 11/2020 |
| KR | 10-2021-0023037 | 3/2021 |
| WO | WO2021-171803 | 9/2021 |

OTHER PUBLICATIONS

Translation of JP2021123149A (Year: 2021).*
Translation of KR20200124988A (Year: 2020).*

* cited by examiner

*Primary Examiner* — Christopher R Zerphey
(74) *Attorney, Agent, or Firm* — Morgan, Lewis & Bockius LLP (57) ABSTRACT

A system and method for controlling an after blow for a mobility includes an air conditioner and a control unit to perform sterilization and prevents bacteria generation through a removal of condensed water generated in an evaporator by operating a blower of an air conditioner to dry the evaporator when turning off a mobility after using the air conditioner in an electric mobility including a high voltage battery.

9 Claims, 4 Drawing Sheets

SYSTEM AND METHOD FOR CONTROLLING AFTER BLOW FOR MOBILITY

CROSS REFERENCE TO RELATED APPLICATION

The present application claims priority to Korean Patent Application No. 10-2022-0101407 filed on Aug. 12, 2022, the entire contents of which is incorporated herein for all purposes by this reference.

BACKGROUND OF THE PRESENT DISCLOSURE

Field of the Present Disclosure

The present disclosure relates to a system and method for controlling an after blow for a mobility, which performs sterilization and prevents bacterial generation through a removal of condensed water generated in an evaporator by operating a blower of an air conditioner to dry the evaporator when turning off a mobility after using the air conditioner in an electric mobility including a high voltage battery.

Description of Related Art

In general, a vehicle is provided with an air conditioning apparatus to promote safe driving and to increase comfort of a passenger in the vehicle while driving. According to changes in the surrounding environment, the passenger may maintain pleasant temperature, moisture, and air environment in the vehicle by use of the air conditioning apparatus.

That is, according to a request of the passenger, the air conditioning apparatus may adjust flow rate and temperature of an air conditioning air and change a direction in which the air conditioning air is discharged to generate a pleasant indoor environment.

Meanwhile, recently, electric vehicles are being commercialized to implement environmentally friendly technology, and the electric vehicles are operated by a motor that receives electricity from a battery and outputs power.

The electric vehicles are provided with a high voltage battery which is charged with high voltage power to drive the motor and an auxiliary battery which is charged with low voltage power to drive peripheral devices. Accordingly, the air conditioning apparatus is driven by receiving power from the auxiliary battery.

Meanwhile, the air conditioning apparatus is provided with an evaporator for forming cooling air, and condensed water is formed on the surface of the evaporator when cooling air is formed through an endothermic action. In the present way, the condensed water generated in the evaporator causes mold generation, and thus there is a problem that odor is generated by contamination of the evaporator.

Accordingly, recently, when a mobility is turned off, a blower of the air conditioning apparatus is operated to suppress the generation of condensed water in the evaporator.

However, the blower of the air conditioning apparatus is driven by receiving power from the auxiliary battery provided in the mobility, and the auxiliary battery has a high risk of discharge due to a relatively low charge capacity, and it is difficult to use a high voltage component, such as PTC alone.

Furthermore, when a mobility is started as power of the auxiliary battery is used, the auxiliary battery needs to be charged again with power of the high voltage battery.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and method for controlling an after blow for a mobility which performs sterilization and prevents bacterial generation through a removal of condensed water generated in an evaporator by operating a blower of an air conditioner to dry the evaporator when turning off a mobility after using the air conditioner in an electric mobility including a high voltage battery.

To achieve the above object, a system for controlling an after blow for a mobility according to an exemplary embodiment of the present disclosure includes: a high voltage battery; a direct current (DC) converter configured to convert power of the high voltage battery to a low voltage power; an air conditioner configured to cool or heat air circulated through an air conditioning blower; and a control unit electrically connected to the DC converter and the air conditioning blower and configured to determine whether to perform an after blow function by checking turning off of the mobility after cooling air is formed in the air conditioner, and to allow the air conditioning blower to be operated with power of the high voltage battery through the DC converter when the after blow function is performed.

The control unit may allow the after blow function to be performed after a preset set time elapses after the mobility is turned off.

The control unit may allow the after blow function to be performed when cooling air is formed for a set operating time or longer than the set operating time in the air conditioner and an outside air temperature is equal to or greater than a predetermined temperature.

In determining whether the after blow function may be performed, the control unit may determine that the after blow function may be performed when the charge amount of the high voltage battery is equal to or greater than a preset minimum charge amount.

The control unit may allow the after blow function not to be performed and inform a driver that the after blow function is not performed when the charge amount of the high voltage battery is less than the preset minimum charge amount.

When the high voltage battery is in a charged state, the control unit may determine that the after blow function may be performed even though the charge amount of the high voltage battery is less than the preset minimum charge amount The air conditioner may include a heater configured to heat air through heat generation, and the control unit may allow the heater to operate with power of the high voltage battery through the DC converter when the after blow function is performed.

The control unit may allow the air conditioning blower to operate with a preset operating strength and holding time when the after blow function is performed.

The control unit may switch to an outdoor air mode when the after blow function is performed, receive outdoor air pollution level information, and switch to an indoor air mode when an air pollution level is equal to or greater than a predetermined level.

Meanwhile, a method for controlling an after blow for a mobility according to an exemplary embodiment of the present disclosure include: a checking step of checking whether to perform an after blow function; and a controlling step of operating an air conditioning blower of an air conditioner with power of a high voltage battery through a direct current (DC) converter when it is determined to perform the after blow function, and of terminating the after blow function when a predetermined time period elapses or a mobility restarts.

The checking step may include a step of determining that the after blow function may be performed when the charge amount of the high voltage battery is equal to or greater than a preset minimum charge amount.

When the charge amount of the high voltage battery is less than the preset minimum charge amount, the checking step may include a step of not performing the after blow function and of informing a driver that the after blow function is not performed.

When the high voltage battery is in a charged state, the checking step may include a step of determining that the after blow function may be performed even though the high voltage battery is less than the preset minimum charge amount.

The checking step may include a step of determining that the after blow function may be performed when a preset set time elapses after the mobility is turned off.

The checking step may include a step of performing the after blow function when cooling air is formed for a set operating time or longer than the set operating time by the air conditioner and an outside air temperature is equal to or greater than the predetermined temperature.

The controlling step may include a step of simultaneously operating the air conditioning blower and the heater of the air conditioner with power of the high voltage battery through the DC converter when it is determined to perform the after blow function.

The controlling step may include a step of operating the air conditioning blower with a preset operating strength and holding time when the after blow function is performed.

The controlling step may include a step of switching to an outdoor air mode when the after blow function is performed, of receiving outdoor air pollution level information, and of switching to an indoor air mode when an air pollution level is equal to or greater than a predetermined level.

The system and method for controlling an after blow for a mobility, which has the above-described structure, can perform sterilization and prevent bacterial generation through a removal of condensed water generated in an evaporator by operating a blower of an air conditioner to dry the evaporator when turning off the mobility after using the air conditioner in an electric mobility including a high voltage battery.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. However, regardless of the reference character, the same or similar constituent elements shall be provided the same reference number and the redundant descriptions thereof shall be omitted.

The suffix "module" and "unit" for the constituent elements used in the description below are provided or mixed only in consideration of the ease of writing the specification, and do not have any distinctive meaning or role in itself each other.

In describing the exemplary embodiments of the present specification, when a specific description of related art is deemed to obscure the subject matter of the exemplary embodiments of the present specification, the detailed description will be omitted. Furthermore, the accompanying drawings are intended to facilitate the understanding of the exemplary embodiments set forth in the present specification, and the technical idea of the present specification is not limited by the accompanying drawings. All alterations, equivalents, and substitutes that are included within the technical idea of the present disclosure may be understood as falling within the scope of the present disclosure.

The ordinal number terms first, second, and the like may be used to describe various constituent elements but should not limit these constituent elements. These terms are only used to distinguish one constituent element from another element.

It should be understood that a constituent element, when referred to as being "connected to" or "coupled to" another constituent element, may be directly connected or directly coupled to the another constituent element or may be coupled or connected to the another constituent element with a third constituent element disposed therebetween. In contrast, it should be understood that a constituent element, when referred to as being "directly coupled to" or "directly connected to" another constituent element, is coupled or connected to the another constituent element without a third constituent element therebetween.

A noun in singular form has the same meaning as nouns when used in plural form, unless it has a different meaning in context.

It should be understood that, throughout the present specification, the term "include," "have," or the like is intended to indicate that a feature, a number, a step, an operation, a constituent element, a component, or a combination thereof is present, without precluding the possibility that one or more other features, numbers, steps, operations, constituent elements, components, or a combination thereof will be present or added.

A control unit may include a communication device which communicates with another control unit or sensor to control a function in charge, a memory which stores an operating system or logic commands and input/output information, and one or more processors which make judgments, calculations, and decisions necessary for controlling the function in charge.

Hereinafter, a system and method for controlling an after blow for a mobility according to an exemplary embodiment of the present disclosure will be described with reference to the accompanying drawings.

Figure 1:
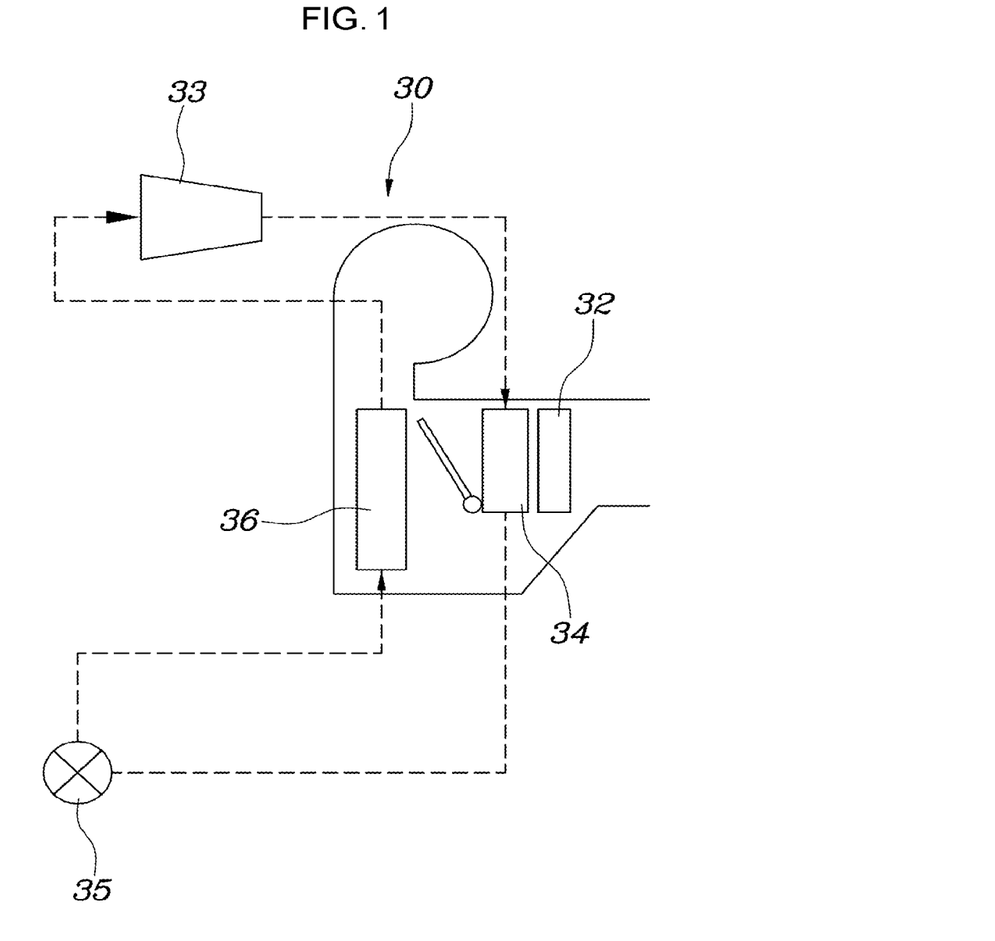
FIG. 1 is a view exemplarily illustrating an air conditioner according to an exemplary embodiment of the present disclosure.
Figure 2:
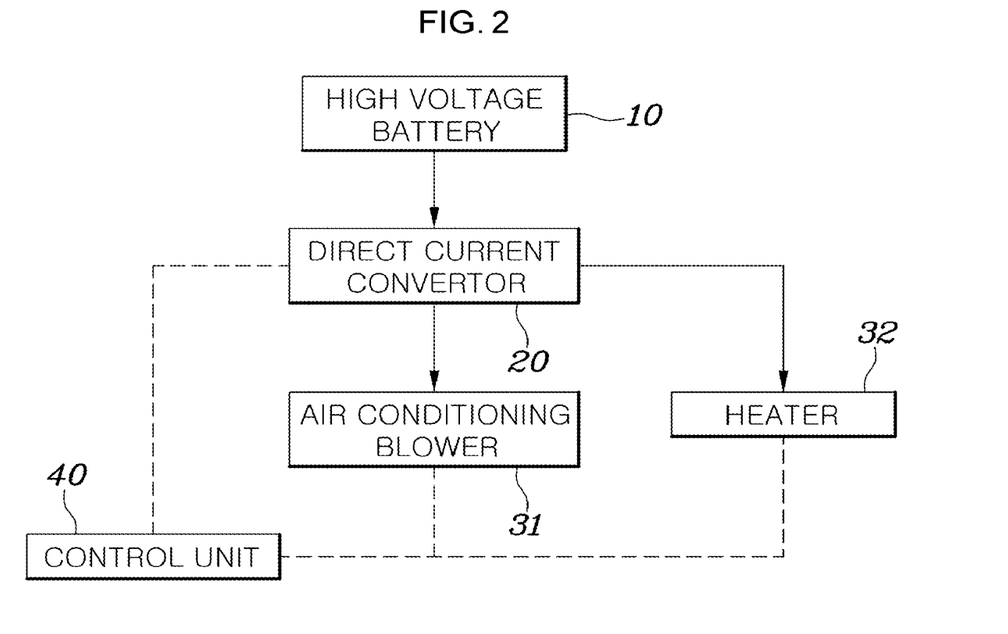
FIG. 2 is a schematic diagram of a system for controlling an after blow for a mobility according to an exemplary embodiment of the present disclosure.

FIG. 1 is a view exemplarily illustrating an air conditioner according to an exemplary embodiment of the present disclosure, and FIG. 2 is a schematic diagram of a system for controlling an after blow for a mobility according to an exemplary embodiment of the present disclosure.

Figure 3:
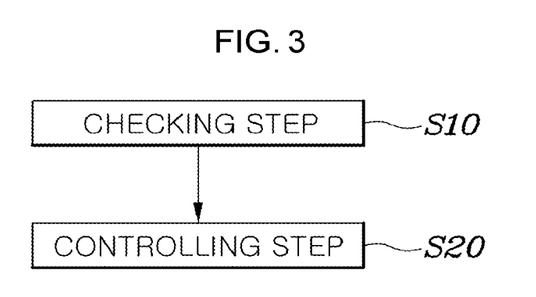
FIG. 3 is a flowchart of a method for controlling an after blow for a mobility according to an exemplary embodiment of the present disclosure.
Figure 4:
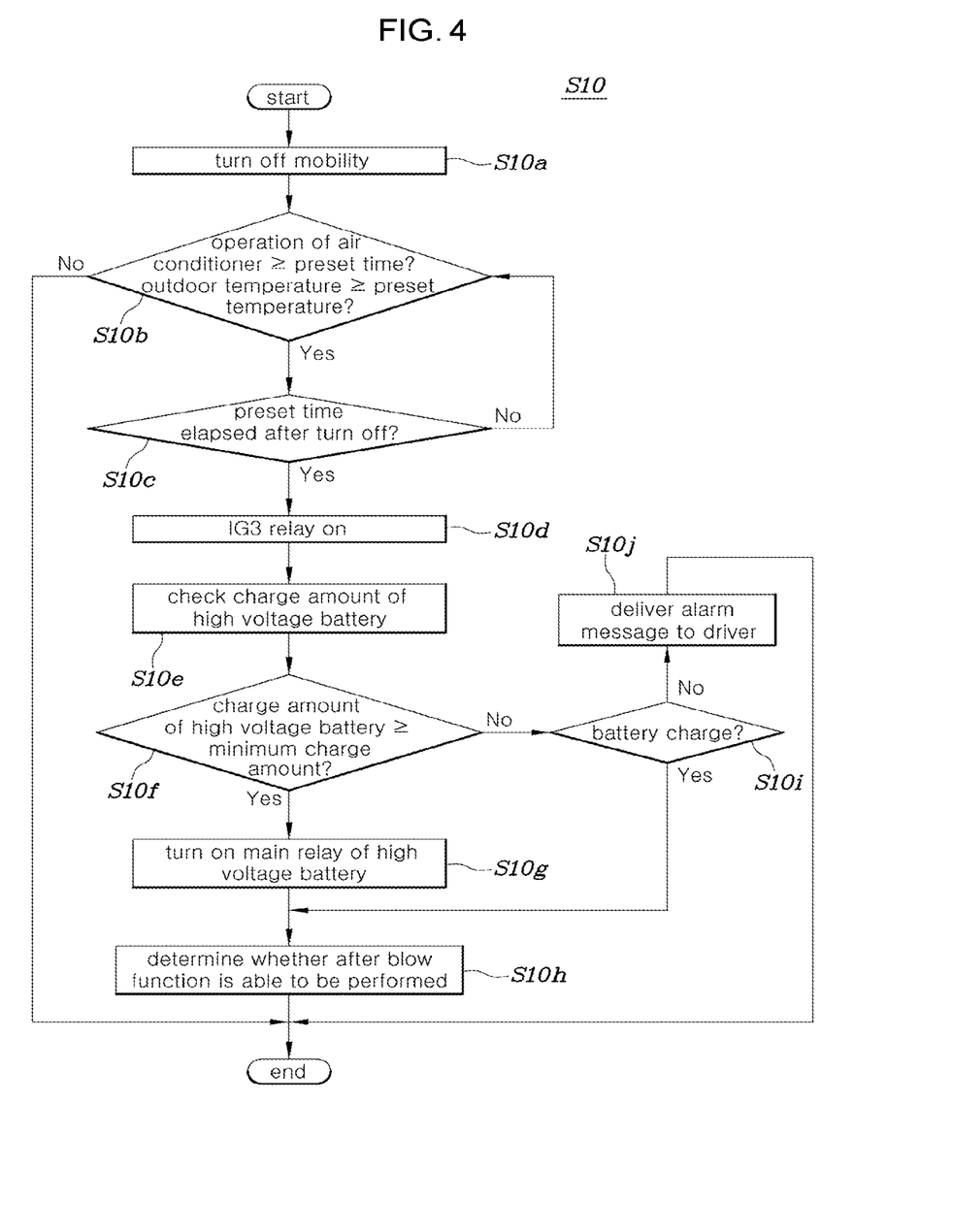
FIG. 4 is a detailed flowchart of a checking step according to the method for controlling the after blow for a mobility illustrated in FIG. 3.
Figure 5:
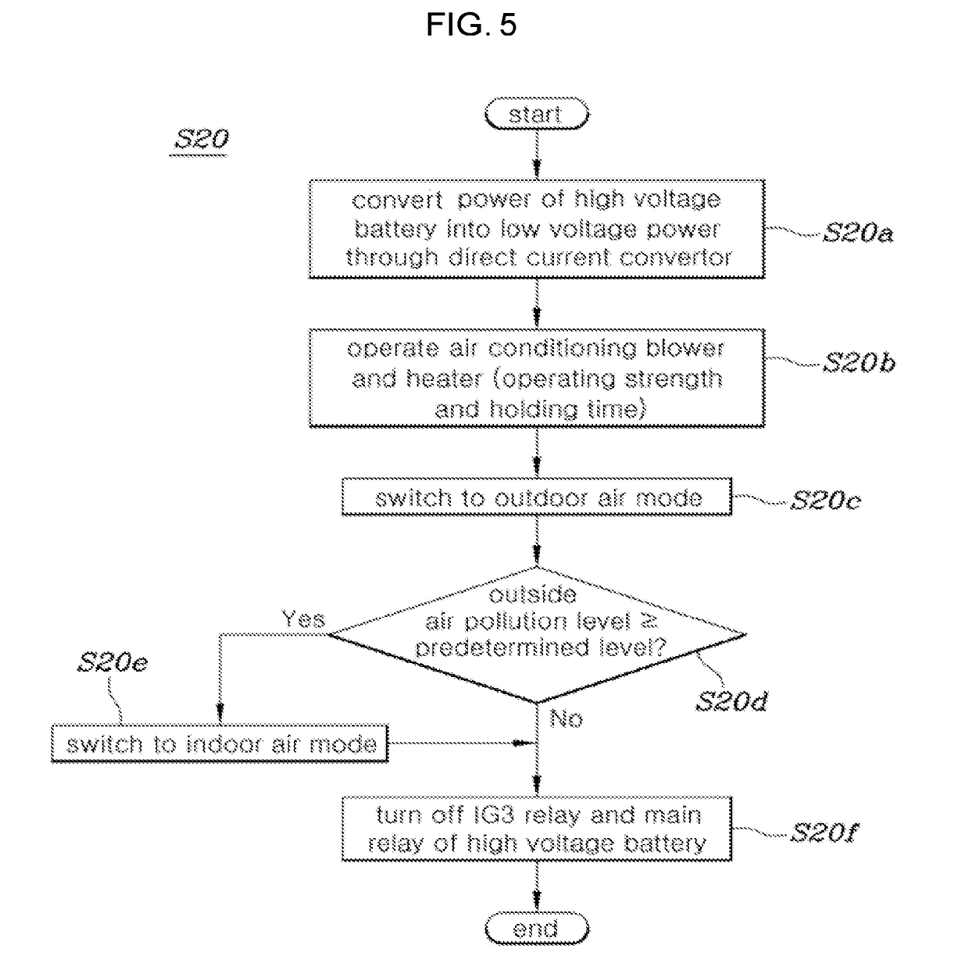
FIG. 5 is a detailed flowchart of a controlling step according to the method for controlling the after blow for a mobility illustrated in FIG. 3.

FIG. 3 is a flowchart of a method for controlling an after blow for a mobility according to an exemplary embodiment of the present disclosure, FIG. 4 is a detailed flowchart of a checking according to the method for controlling the after blow for a mobility illustrated in FIG. 3, and FIG. 5 is a detailed flowchart of a controlling according to the method for controlling the after blow for a mobility illustrated in FIG. 3.

The system for controlling an after blow for a mobility according to an exemplary embodiment of the present disclosure as illustrated in FIGS. 1 to 2 includes: a high voltage battery 10; a direct current (DC) converter 20 configured to convert power of the high voltage battery 10 to a low voltage power; an air conditioner 30 configured to cool or heat air circulated through an air conditioning blower 31; and a control unit 40 configured to determine whether to perform an after blow function by checking turning off of the mobility after cooling air is formed in the air conditioner 30, and to allow the air conditioning blower 31 to operate with power of the high voltage battery 10 through the DC converter 20 when the after blow function is performed.

The present disclosure may be applied to a hybrid mobility or electric mobility provided with a high voltage battery 10 and a low voltage battery.

Furthermore, the DC converter 20 may be configured to supplement the power of the low voltage battery using the high voltage battery 10, and the DC converter 20 may be configured as a low DC-DC converter (LDC).

Furthermore, as illustrated in FIG. 1, as a refrigerant is circulated to a compressor 33, a condenser 34, an expansion value 35, and an evaporator 36, the air conditioner 30 may provide air conditioning air for heating to an indoor through the condenser 34, and may provide air conditioning air for cooling to the indoor through the evaporator 36.

The present disclosure relates to an after blow that prevents contamination of the evaporator 36 by removing condensed water generated on the surface of the evaporator 36 as the evaporator 36 forms air conditioning air for cooling and heating after the mobility is turned off, and implements the after blow using power of the high voltage battery 10, increasing life of the low voltage battery and efficiently removing condensed water.

That is, because high voltage power of the high voltage battery 10 may be converted into low voltage power through a power converter and the low voltage power may be supplied to the air conditioning blower 31, the air conditioning blower 31 and a heater 32 to be described below may be normally driven even in a turning OFF state.

Furthermore, generally, as the air conditioning blower is driven with the power of the low voltage battery, there is a limitation in which durability of the low voltage battery is degraded and a heater with high power consumption is not operated, but in the present disclosure, the air conditioning blower 31 and the heater 32 are driven with the power of the high voltage battery 10, which makes it possible to ensure capacity and life of the low voltage battery.

The present disclosure will be described in detail. The control unit 40 is configured to check whether the mobility is turned off after cooling air is formed in the air conditioner 30 and then determines whether to perform an after blow function.

When the after blow function is performed, an IG3 relay and a main relay of the high voltage battery may be driven. Herein, the IG3 relay is provided to supply power of a power meter component, and the main relay of the high voltage battery is provided to operate the DC converter 20 and to use power of the high voltage battery.

The conditions for determining a performance of the after blow function may be following conditions.

The control unit 40 is configured to allow the after blow function to be performed in a case where cooling air is formed in the air conditioner 30 for a set operating time or longer than the set operating time, and an outdoor temperature is equal to or greater than a predetermined temperature.

Herein, the set operating time may be set to 10 minutes, and may be adjusted to a time that condensed water is generated in the evaporator 36 as cooling air is formed. The predetermined temperature may be set to 15° C., and may be adjusted to a temperature at which condensed water is generated in the evaporator 36 according to a difference between the surface temperature of the evaporator 36 and the outdoor air temperature.

In the present way, in a case where the cooling air is formed for the set operating time or longer in the air conditioner 30, or the outdoor air temperature is equal to or greater than the predetermined temperature, the control unit 40 is configured to determine that condensed water may be generated in the evaporator 36 and contamination may occur, and allow the after blow function to be performed.

Furthermore, the control unit 40 is configured to allow the air blow function to be performed after a preset set time elapses after the mobility is turned off.

The set time may be set to 10 minutes, and the set time is configured to prevent the occurrence of heterogeneity due to a sudden operation of the air conditioning blower 31 after a driver leaves the mobility after the mobility is turning off.

As described above, the control unit 40 is configured to check whether cooling air is formed through the air conditioner 30 and the outdoor temperature when the mobility is turned off, and determines that the after blow function may be performed when the set time elapses from the time that the mobility is turned off.

The determination of the control unit 40 may be determination on whether the IG3 relay is turned on.

Furthermore, in determining whether the after blow function is performed, the control unit 40 further checks the charge amount of the high voltage battery 10.

In the present disclosure, when the after blow function may be performed, the control unit 40 is configured to allow the air conditioning blower 31 of the air conditioner 30 to operate with power of the high voltage battery 10. Accordingly, by checking the charge amount of the high voltage battery 10, the control unit 40 is configured to check whether there is a power amount configured for performing the after blow function in the high voltage battery 10, and in a case where the after blow function may be performed by the charge amount of the high voltage battery 10, the control unit 40 is configured to allow the corresponding function to be performed.

The determination of the control unit 40 may be determination on whether the main relay of the high voltage battery is turned on.

When the charge amount of the high voltage battery 10 is equal to or greater than a preset minimum charge amount, the control unit 40 is configured to determine that the after blow function may be performed. Herein, the preset minimum charge amount may be set to about 10% of the maximum charge amount of the high voltage battery 10, and may be changed according to a specification of the high voltage battery 10 and a driving specification of the air conditioner 30. In the present way, the control unit 40 is configured to allow the after blow function to be performed, in a state in which the charge amount of the high voltage battery 10 is stabilized.

When the charge amount of the high voltage battery 10 is less than the preset minimum charge amount, the control unit 40 is configured to allow the after flow function not to be performed, preventing durability degradation of the high voltage battery 10.

Furthermore, because the charge amount of the high voltage battery 10 is less than the preset minimum charge amount, the control unit 40 may inform a driver that the after flow function is not performed. In the instant case, the control unit 40 may inform the driver that the after flow function is not performed through a mobile phone possessed by the driver, and may inform to the driver that the after blow function is not performed and that the charge amount of the high voltage battery 10 is insufficient, and allows the battery to be charged.

Meanwhile, when the high voltage battery 10 is in a charged state, the control unit 40 is configured to determine that the after blow function may be performed even though the charge amount of the high voltage battery 10 is less than the preset minimum charge amount.

That is, even though the charge amount of the high voltage battery 10 is less than the preset minimum charge amount, the control unit 40 is configured to determine that the air conditioning blower 31 may be operated with power of the high voltage battery 10 in a case where the high voltage battery 10 is being charged. Accordingly, the durability of the high voltage battery 10 is prevented from being degraded due to excessive decrease in the charge amount even though the after blow function is performed.

As described above, the control unit 40 may stabilize the high voltage battery 10 and remove the condensed water generated in the evaporator 36 through normal driving of the air conditioning blower 31 by determining whether the after blow function may be performed in consideration of the charge amount and charging state of the high voltage battery 10.

In the present way, the control unit 40 is configured to allow the heater 32 to operate with the power of the high voltage battery 10 through the DC converter 20 when a condition that the after blow function may be performed is satisfied and thus the after blow function is performed.

That is, the air conditioner 30 may include the heater 32 configured to heat air through heat generation, and the heater 32 may be formed of a PTC. During operation, the heater 32 generates heat to heat and dry the air.

Through this, as the after blow function is performed, when the air conditioning blower 31 and the heater 32 of the air conditioner 30 operate simultaneously, dried heating air is provided to the evaporator 36, rapidly and effectively configured for drying the condensed water generated in the evaporator 36.

The heater 32 has high power consumption due to its heat generation characteristics, but power of the high voltage battery 10 is converted to a low voltage power through the DC converter 20 and the low voltage power is supplied to the heater 32, so that the heater 32 may maintain a stable driving state with the power of the high voltage battery 10.

Meanwhile, the control unit 40 is configured to allow the air conditioning blower 31 to operate with a preset operating strength and holding time when the after blow function is performed.

Herein, the operating strength and holding time may be set to remove the condensed water generated in the evaporator 36 as the air conditioning blower 31 is operated. The operating strength and holding time may be adjusted according to the operating strength and time of the evaporator 36 before the mobility is turned off.

Furthermore, the heater 32 may also be driven for the same holding time together with the air conditioning blower 31, accelerating the removal of condensed water.

Furthermore, as the after blow function is maintained for only a predetermined time period, excessive power consumption of the high voltage battery 10 is prevented.

Meanwhile, the control unit 40 is configured to switch to an outdoor air mode when the after blow function is performed, receives outdoor air pollution level information, and switches to an indoor air mode when an air pollution level is equal to or greater than a predetermined level.

That is, the control unit 40 accelerates the removal of condensed water by switching to the outdoor air mode so that outside air flows when the after blow function is performed.

the control unit 40 may receive information according to a pollution level of outside air through a sensor configured for measuring the pollution level of outside air and switch to the indoor air mode when the outdoor air pollution level or fine dust is equal to or greater than a predetermined level. For the present reason, condensed water may be effectively removed, and the contamination of the evaporator 36 and indoor contamination due to contaminated air may be prevented.

Meanwhile, as illustrated in FIG. 3, FIG. 4, and FIG. 5, a method of controlling an after blow for a mobility according to an exemplary embodiment of the present disclosure includes: a checking step S10 of checking whether to perform the after blow function; and a controlling step S20 of operating the air conditioning blower 31 of the air conditioner 30 with power of the high voltage battery 10 through the DC converter 20 when it is determined to perform the after blow function, and of terminating the after blow function when a predetermined time period elapses or a mobility restarts.

Through this, as the evaporator 36 forms air conditioning air for cooling after the mobility is turned off, the present disclosure prevents contamination of the evaporator 36 by removing condensed water generated on the surface thereof. High voltage power of the high voltage battery 10 is converted into low voltage power through the DC converter 20 and then the low voltage power is supplied as power to the air conditioning blower 31, which makes it possible to implement the after blow with the power of the high voltage battery 10 to increase the life of the low voltage battery and efficiently remove the condensed water.

The method for controlling an after blow according to an exemplary embodiment of the present disclosure may be performed with a checking step S10 and a controlling step S20.

As illustrated in FIG. 4, in the checking step S10, it is checked whether the mobility is turned off (S10a). Thereafter, it is checked that cooling air is formed in the air conditioner 30 for a set operating time or longer than the set operating time, and the outdoor air temperature is equal to or greater than a predetermined temperature (S10b).

Furthermore, in the checking step S10, by checking whether a set time elapses after the mobility is turned off, it is determined to perform the after blow function (S10c)

As described above, the present disclosure may check whether cooling air is formed and the outdoor temperature through the air conditioner 30 when the mobility is turned off, and determine that the after blow function may be performed when a set time elapses from the time that the mobility is turned off, and thus may turn on the IG3 relay (S1 Od).

Furthermore, in the checking step S10, a charge amount of the high voltage battery 10 is checked (S10e). Herein, it is determined whether the charge amount of the high voltage battery 10 is equal to or greater than a preset minimum charge amount (10f).

Accordingly, when the charge amount of the high voltage battery 10 is equal to or greater than the preset minimum charge amount, the main relay of the high voltage battery 10 may be turned on (S10g). Accordingly, it is determined that the after blow function may be performed (S10h).

That is, the after blow function is performed in a state in which the charge amount of the high voltage battery 10 is stabilized, and when the charge amount of the high voltage battery 10 is less than the preset minimum charge amount, the after blow function is not performed, making it possible to prevent durability degradation of the high voltage battery 10.

Meanwhile, in the checking step S10, when the high voltage battery 10 is in a charged state, it is determined that the after blow function may be performed even though the charge amount of the high voltage battery 10 is less than the preset minimum charge amount (S10i).

In the checking step S10, even though the charge amount of the high voltage battery 10 is less than the preset minimum charge amount, when the high voltage battery 10 is being charged, it is determined that the air conditioning blower 31 may be operated with the power of the high voltage battery 10. Accordingly, durability of the high voltage battery 10 is prevented from being degraded due to excessive decrease in the charge amount even though the after blow function is performed.

Meanwhile, in the checking step S10, when the charge amount of the high voltage battery 10 is less than the preset minimum charge amount, the after blow function is not performed, and a driver is notified that the after blow function is not performed (S10j).

Through this, the driver may know that the after blow function is not performed, and the charge amount of the high voltage battery 10 is insufficient while the after blow function is not performed, and may allow the battery to be charged.

In the present way, when it is determined to perform the after blow function through the checking step S10, the controlling step S20 is performed as illustrated in FIG. 5.

In the controlling step S20, the high voltage power of the high voltage battery 10 is converted into low voltage power for use as power of the air conditioning blower 31 and the heater 32 through the DC converter 20 (S20a).

Though this, the air conditioning blower 31 and the heater 32 of the air conditioner 30 operate together with the power of the high voltage battery 10 (S20b).

That is, as the after blow function is performed, when the air conditioning blower 31 and the heater 32 of the air conditioner 30 are simultaneously operated, the dried heating air flows toward the evaporator 36, rapidly and effectively drying the condensed water generated in the evaporator 36.

The heater 32 has high power consumption due to its heat generation characteristics, but the heater 32 may maintain a stable driving state with power of the high voltage battery 10 as power of the high voltage battery 10 is converted into low voltage power through the DC converter 20, and the low voltage power is supplied to the heater 32.

Meanwhile, in the controlling step S20, the air conditioning blower 31 is operated with a preset operating strength and holding time when the after blow function is performed.

Furthermore, the heater 32 may also be operated together with the air conditioning blower 31 to be driven for the same holding time, accelerating the removal of the condensed water.

In the present way, as the after blow function is maintained only for a predetermined time period, excessive power consumption of the high voltage battery 10 is prevented.

Meanwhile, in the controlling step S20, switching to the outdoor air mode is performed when the after blow function is performed (S20c). Furthermore, in the controlling step S20, outside air pollution level information is received and it is determined whether the air pollution level is equal to or greater than a predetermined level (S20d). Herein, when the outside air pollution level is equal to or greater than the predetermined level, switching to the indoor air mode is performed (S20e).

In the present way, when the after blow function is performed, the removal of condensed water is accelerated by switching to the outdoor air mode to circulate outside air.

In the controlling step S20, indoor contamination may be prevented by receiving information according to the pollution level of outside air through a sensor configured for measuring the pollution level of outside air and switching to the indoor air mode when the pollution level of outside air or fine dust is equal to or greater than a predetermined level.

For the present reason, condensed water may be effectively removed, and the contamination of the evaporator 36 and indoor contamination due to contaminated air may be prevented.

When the after blow function is completed, the IG3 relay and the main relay of the high voltage battery are turned off, and the control unit 40 is also switched to a sleep state (S20f).

As described above, according to an exemplary embodiment of the present disclosure, the evaporator is dried by operating the blower of the air conditioner in the electric mobility including the high voltage battery when turning off a mobility after using the air conditioner, and thus condensed water generated in the evaporator is removed and sterilization is performed and bacterial generation is prevented, making it possible to increase the convenience of using the air conditioner and to improve commercial quality.

Furthermore, by driving the air conditioning blower and the heater using the power of the high voltage battery, the capacity and life of the low voltage battery are prevented from being reduced, and the air conditioning blower and the heater may each maintain a stable driving state with the power of the high voltage battery.

Furthermore, there is no demand for a separate battery to drive the air conditioning blower and the heater, which reduces manufacturing costs.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for controlling an after blow for a mobility, the system comprising:
 a battery;
 a direct current (DC) converter configured to convert power of the battery to a low voltage power;
 an air conditioner configured to cool or heat air which is circulated through an air conditioning blower connected to the DC converter; and
 a control unit electrically connected to the DC converter and the air conditioning blower and configured to determine whether to perform an after blow function by checking turning off of the mobility, and to allow the air conditioning blower to operate with power of the battery through the DC converter when the after blow function performed in the mobility is turning OFF state, wherein, when the battery is not in a charging state and a charge amount of the battery is less than a preset minimum level, the control unit is configured not to perform the after blow function, and wherein, when the battery is in the charging state, the control unit is configured to allow the air conditioning blower and an electric heater to operate using power from the battery in the mobility's off state, even if the charge amount of the battery is less than the preset minimum level.

2. The system of claim 1, wherein the control unit is configured to allow the after blow function to be performed after a preset set time elapses after the mobility is turned off.

3. The system of claim 1, wherein the control unit is configured to allow the after blow function to be performed when cooling air is formed for a set operating time or longer than the set operating time in the air conditioner and an outside air temperature is equal to or greater than a predetermined temperature.

4. The system of claim 1, wherein in determining whether the after blow function is able to be performed, the control unit is configured to conclude that the after blow function is able to be performed when a charge amount of the battery is equal to or greater than a preset minimum charge amount.

5. The system of claim 4, wherein the control unit is configured to inform a driver that the after blow function is not performed when the charge amount of the battery is less than the preset minimum charge amount.

6. The system of claim 1, wherein the air conditioner includes a heater configured to heat air through heat generation, and wherein the control unit electrically connected to the heater is configured to allow the heater to operate with the power of the battery through the DC converter when the after blow function is performed.

7. The system of claim 1, wherein the control unit is configured to allow the air conditioning blower to operate with a preset operating strength and holding time when the after blow function is performed.

8. The system of claim 1, wherein the control unit is configured to switch to an outdoor air mode when the after blow function is performed.

9. The system of claim 8, wherein the control unit is configured to receive outdoor air pollution level information, and to switch to an indoor air mode when an air pollution level is equal to or greater than a predetermined level.

* * * * *